F. F. UEHLING.
MEANS FOR REMOVING ONE OR MORE INGREDIENTS OF GAS OR OTHER SUBSTANCE.
APPLICATION FILED SEPT. 2, 1920.
1,412,790. Patented Apr. 11, 1922.
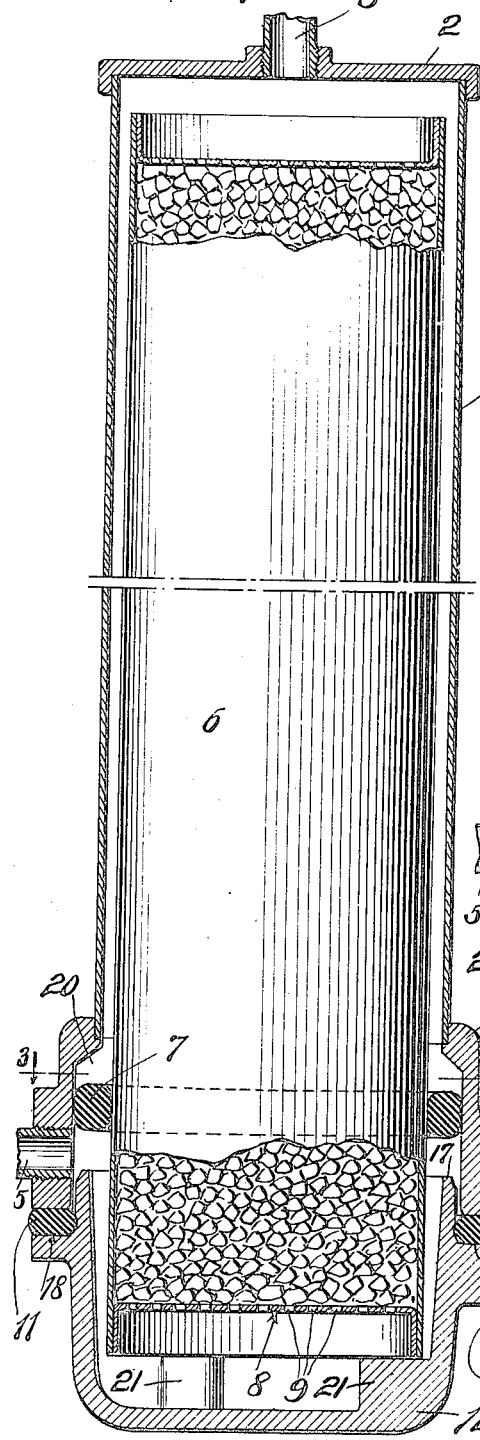
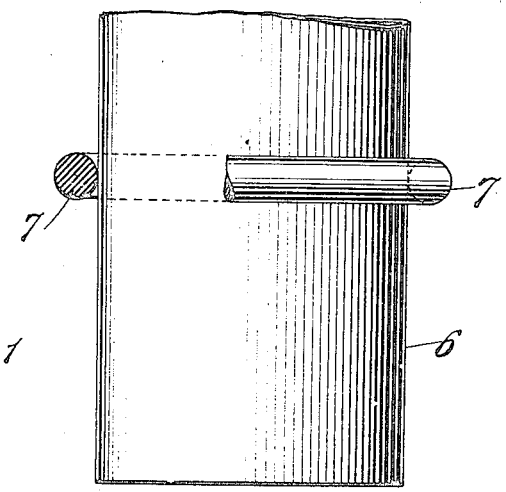
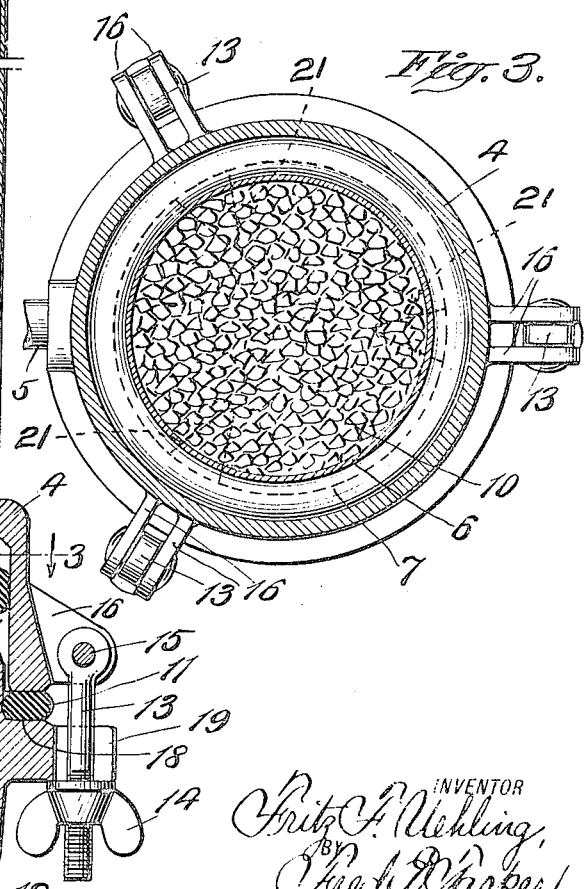
INVENTOR
Fritz F. Uehling,
BY
ATTORNEY

UNITED STATES PATENT OFFICE.

FRITZ F. UEHLING, OF PASSAIC, NEW JERSEY, ASSIGNOR TO UEHLING INSTRUMENT COMPANY, OF PATERSON, NEW JERSEY, A CORPORATION OF NEW JERSEY.

MEANS FOR REMOVING ONE OR MORE INGREDIENTS OF GAS OR OTHER SUBSTANCE.

1,412,790.     Specification of Letters Patent.    Patented Apr. 11, 1922.

Application filed September 2, 1920. Serial No. 407,696.

*To all whom it may concern:*

Be it known that I, FRITZ F. UEHLING, a citizen of the United States, and resident of Passaic, in the county of Passaic and State of New Jersey, have invented certain new and useful Improvements in Means for Removing One or More Ingredients of a Gas or other Substance, of which the following is a specification, reference being had thereto in the accompanying drawing.

This invention refers to a device for insertion into or combination with a pipe or other transmission line, at any suitable point in the length thereof, which line carries a gas, liquid, or fluid, for the removal from said gas or other substance by filtration, absorption, chemical combination, or otherwise, of one or more of the constituents or ingredients of such gas, liquid, or fluid. One of the objects of the invention which may be mentioned is the provision of means for accomplishing the removal of an ingredient or ingredients from the gas or other substance by filtration or absorption without any disturbance of or in any way dismantling the main transmission line when the absorbent or filtering material is introduced or removed and by the use of very simple and inexpensive appliances or instrumentalities. And with this and other objects in view the invention may be said to consist essentially in the construction, arrangement and combination of the various parts, substantially as will be hereinafter more fully described and claimed.

In the accompanying drawing illustrating my invention:

Figure 1 is a longitudinal section of my improved absorptive or filtering appliance for the extraction of one or more constituents of a gas or the like being conveyed through a main line, and the said appliance being delineated in its operative relations to said main line.

Figure 2 is a side view of a part of the removable chamber or cartridge which carries the absorptive or filtering material.

Figure 3 is a horizontal sectional plan view on the line 3, 3, of Figure 1.

Similar characters of reference denote corresponding parts throughout the different views of the drawing.

1 designates a section of a pipe, conduit, channel, passage, or other transmission line for conveying a gas, liquid or fluid from one point to another irrespective of the kind of gas, the nature of the line, or the distance of the points between which it runs, said section 1 being preferably of larger diameter than the remainder of the line in order that it may provide a compartment easily accessible for the introduction of a box, chamber, carton, or cartridge carrying some suitable chemical, absorptive substance, or filtering material, for taking out one or more constituents of the gas or the like. Said section 1 is provided at one end with a suitable opening which may be an inlet or an outlet and at which point coupling is made with the main line (not shown) and at the other end with another opening which may be an inlet or an outlet and at which latter point coupling is also made with another portion of the main line (not shown), said section 1 being therefore interposed between two sections of the main line so that all of the gas or other material passing through the main transmission line will have to pass through section 1. The one end of the said section 1 has a head 2 in which there is an opening at a point where a pipe section 3 is coupled thereto, which opening may be central or otherwise and consist of one or more orifices or perforations; while the other end of section 1 is provided with an encircling member 4 consisting of a sleeve or ring which is provided with an opening which is lateral, said opening consisting of one or more orifices or perforations and being at a point where a pipe section 5 is connected thereto, and being designed to establish a lateral connection between this end of the section and the main line, while the main cylindrical end of the said terminal sleeve 4 is open in order that the cartridge or chamber 6 may be inserted thereinto and withdrawn therefrom at will, said open end of sleeve 4 being designed to be covered from time to time by means of cover 12 after the cartridge or chamber 6 has been inserted in position, and then again at other times opened, and thus it will be seen that the cartridge is readily inserted or withdrawn without any disturbance of the main line.

It will thus be evident that the gas, liquid or fluid is permitted to flow readily through the main line and through the section 1 without disturbance or hindrance and without any breaking of the line; and I am able to provide a section, as 1, through which the gas departs through the lateral connection at one end so that an opening is provided at this end of the section through which a chamber or body may be inserted or withdrawn, the same having the function of carrying a chemical or some other material which the gas may come in contact with for the purpose of being freed from one or more of its constituents.

The cover 12 is formed with a tubular ring or sleeve 17 which is designed to enter the sleeve 4 telescopically, as shown in Figure 1, and adjoining said flange 17 is a shoulder 18, between which and the periphery of the sleeve 4 is a compressible gasket 11 of rubber or other suitable material, so that when the cover 12 is in position on the end of sleeve 4 a very tight joint may be made at this point through which no gas can possibly pass. The adjustment of the cover 12 may utilize a large number of different means and may have hinges and locking devices, but a simple plan for holding it fixedly in place consists of using pins 13 pivoted by means of pivots 15 to ears 16 on the sleeve 4, there being say three of these pivoted pins 13, which drop into the slots or openings 19 on the outer wall of the cover 12 and being screw-threaded at their ends are provided with thumb nuts 14 which screw up tightly against the slotted portions of the cover 12, and thus securely bind the cover against the gasket 11 and produce an effective closing of the end of section 1 when the cartridge or chamber 6 containing the absorbent or filtering material is inside the same and is performing its normal functions.

The box, chamber, or cartridge which may be employed with my device consists of a cylindrical member 6 containing any suitable kind of absorptive or filtering material having the function of taking up one or more ingredients or constituents of the gas, liquid or fluid as may be required, the range of material in this respect being very wide and being suited to the special object of the device and the particular kind of gas which is to be operated upon, said cylindrical carton or cartridge itself being of any kind of paper, paper fabric, cardboard, paper pulp, or other substance and having heads 8 which are usually kept intact and imperforate until the cartridge is ready to be inserted for use in order that up to that time the material within may be kept air-tight or dust-proof and consequently not subject to deterioration or loss, but these heads 8 just before the cartridge is inserted into the section 1 will be punched with a suitable number of orifices or perforations, as 9, in order that the gas may pass through the same in contact with the substance within.

The carton or cartridge 6 will have a diameter slightly less than the interior diameter of the section 1, in order that it may be easily removed when cover 12 at the bottom is taken off. Around this cartridge 6 and tightly clasping the same is a rubber ring 7, of any desired size, strength and elasticity. The ring 7 is placed on the member 6 before its insertion into the section 1 at any preferred point, and its object is to assure the transmission of the gas or other material only through chamber 6 and not through the annular space between it and the wall of section 1. The sleeve 4 has an interior diameter somewhat in excess of the diameter of the section 1 in order to provide an annular cavity 20 somewhat wider than the annular space between the carrier 6 and the section 1 in order that the ring 7 may be accommodated in said cavity 20 and when the carrier is being introduced into section 1 the ring 7 will wedge tightly into the cavity 20 and roll more or less between the wall of said cavity and the carton 6, being more or less compressed by such action so that it will function as a gasket and make a very tight packing so that an air and gas-tight joint will be effected at that point. There will therefore be two gas-tight joints, one between the wall of the cartridge 6 and the wall of the sleeve 4, and another between the peripheral edge of sleeve 4 and the adjacent shoulder 18 of the cover 12; hence the gas which enters through the inlet 3 can only pass through the perforations in the end of the cartridge 6 and through the material within said cartridge, emerging from the cartridge at the lower end thereof through the perforations 9 at that point and then coursing around in the space between the cartridge and the sleeve until it finds an outlet through the passage 5, its course on the outside of chamber 6 being entirely obstructed by the packing ring 7 so that none of the gas can reach the outlet 5 from the inlet 3 without going through chamber 6 and being acted upon by material contained within the latter. When the carton or chamber 6 is in position in sleeve 1, and the cover 12 is closed, the lugs 21 of which there may be three, or any other number, on the cover 12 will be tight against the end of carton 6 and will assist in holding the latter in position, as shown in Figure 1, so that the gas may flow freely around the end of carton 6 in the space in cover 12.

Many changes may be made in the precise construction, combination and relation of the different parts, particularly with respect to the way in which tight joints are made at the desired points and the manner in which the various parts are assembled to carry out their functions in the most satisfactory way, and I therefore reserve the liberty of rearranging and reconstructing the various details in order to suit the device for use in a great variety of locations and for many purposes under and within the scope of the appended claims and in order that it may function most effectually as a device for carrying an absorptive or filtering material which will extract one or more ingredients of a gas or other substance passing through a main line without any disturbance in said line when the carton, cartridge or chamber containing said material is inserted or removed.

Having thus described my invention, what I claim as new and desire to secure by Letters Patent, is:

1. In a main transmission line for gas or the like, the combination of a section having means for introducing a gas at one end and removing it at the other end, the latter means being located so as not to obstruct entrance into said section, and a chemical-carrying cartridge adapted to be inserted into the said section and being provided with an encircling resilient ring.

2. The combination of a main line section, having an inlet at one end and an outlet at the other, one being lateral, a cover for the end having the lateral outlet, means for securing a tight joint for said cover, and a carrier for absorptive material having an encircling resilient ring for holding it in position in the main pipe section and effecting a tight joint where it is so held.

3. The combination of a main line having a section provided with an inlet at one end and an outlet at the other end, said outlet being formed contiguous to an inner cavity of larger diameter than the section proper, a cover for said cavity together with means for holding it in place with an air-tight joint, and a member for carrying absorptive material and provided with an encircling ring, said member being adapted to be inserted in the main line section.

4. The combination with a transmission line section having a lateral offset gas passage at one end and a main opening to permit the unobstructed entrance into and removal from the section, of a carrier containing absorptive material and adapted to be inserted into the said section, said carrier having a surrounding ring.

5. The combination with a chamber having an inlet and an outlet, of another chamber inside thereof also having an inlet and an outlet, a ring or gasket for sealing the space between the two chambers so that all the gas or other medium passing through the first outside chamber will be forced to pass through the inner chamber, said inner chamber containing a material which by filtration or absorption will remove one or more of the constituents of the gas or other medium which comes in contact with it, and means for opening one end of the outer chamber so that the inner chamber can be removed or replaced without in any way interfering with the inlet and outlet of the outer chamber.

6. The combination with a transmission line for gas, liquid, or other substance, of a section therein having an inlet and an outlet through which the substance transmitted enters and leaves said section, a chamber or tube inside of said section, means for sealing the space between the said section and the said chamber within the section, so that all the substance transmitted through said transmission line will pass through the said inner chamber, and means for opening one end of the section so that the inside chamber can be removed without in any way interfering with the inlet or outlet of the section and without interfering with the continuity of the transmission line itself.

7. The combination with a transmission line for gas, liquid or any other material, of a section in said line and forming part thereof, the same having an inlet through which the material transmitted enters said section and an outlet through which said material leaves said section, a chamber inside of said section containing a substance that will filter out or absorb one or more of the constituents of the material transmitted through it, a rubber ring or other means for sealing the space between the inside chamber and the section containing it so that all the gas or other material transmitted will pass through said inner chamber, and a cap or cover adapted to close the opening at one end of said section to permit the removal of said inside chamber without the necessity of disconnecting the section from the transmission line proper, said cover having lugs on the inside thereof on which the bottom of the inside chamber can rest without interfering with the gas or other material passing through it.

In testimony whereof I hereunto affix my signature.

FRITZ F. UEHLING.